R. INGHAM.
PRESSURE GAUGE.
APPLICATION FILED MAR. 5, 1920.
1,414,133.
Patented Apr. 25, 1922.
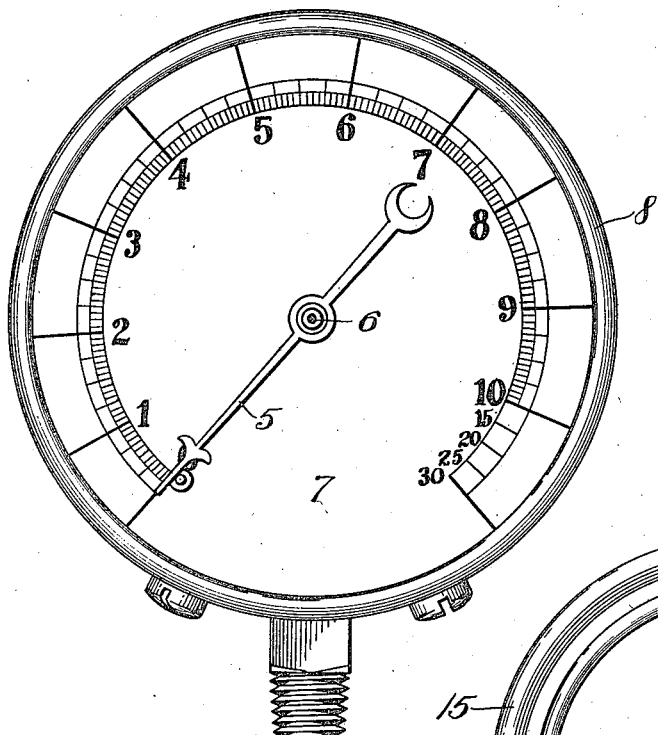
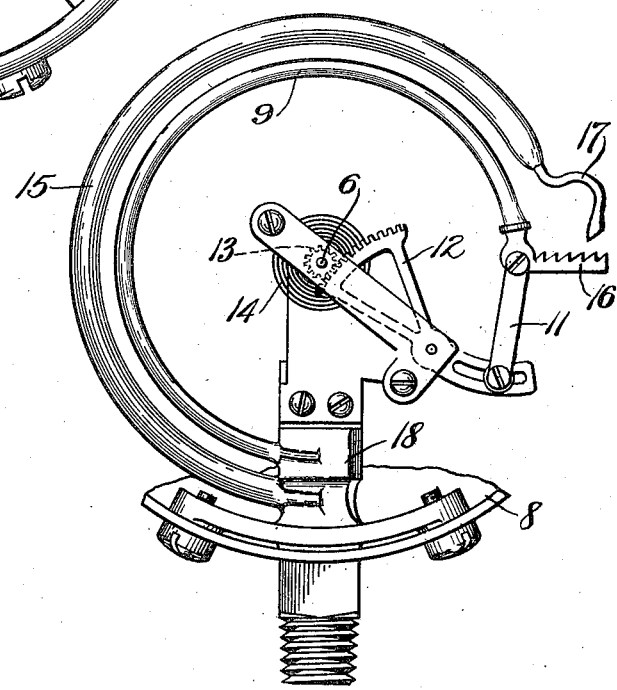
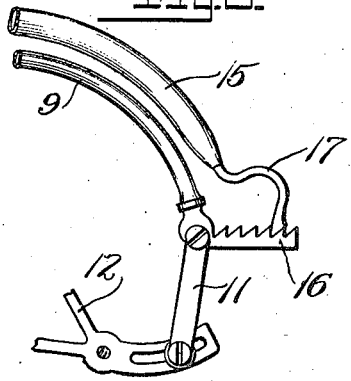
Inventor
Robert Ingham
By his Attorneys

UNITED STATES PATENT OFFICE.

ROBERT INGHAM, OF SELLERSVILLE, PENNSYLVANIA, ASSIGNOR TO UNITED STATES GAUGE COMPANY, OF NEW YORK, N. Y., A CORPORATION OF PENNSYLVANIA.

PRESSURE GAUGE.

1,414,133.  Specification of Letters Patent.  Patented Apr. 25, 1922.

Application filed March 5, 1920. Serial No. 363,517.

*To all whom it may concern:*

Be it known that I, ROBERT INGHAM, a citizen of the United States of America, residing at Sellersville, Pennsylvania, have invented a new and useful Pressure Gauge, of which the following is a specification.

My invention relates particularly to what may be termed a retard gauge construction in which the pointer moves over a certain scale distance graduated for accurate readings and over an extended scale graduated with more closely spaced readings.

The main object is to provide a reliable construction of this type which can be adjusted readily and which is permanent in its accuracy.

Briefly considered, the invention contemplates the use of two springs both of which are preferably Bourdon tubes, one of which is more sensitive than the other. The sensitive tube is connected to the indicating pointer in the usual manner, and the less sensitive tube is adapted to be connected to the more sensitive tube for cooperative action over the upper scale readings of the gauge. The connection between the two tubes is such as to permit of ready adjustment.

Fig. 1 is a front view of a gauge embodying the improvements of my invention.

Fig. 2 is a front view with a casing broken away and showing the parts in what may be termed their normal zero pressure position.

Fig. 3 is a fragmentary view showing the interengagement or connection of the two tubes as it occurs in the upper scale readings of the device.

The pointer 5 is carried by a shaft 6 in front of the dial 7 in the casing 8 as is usual in structures of this character. The movable end of the Bourdon tube 9 is connected by a link 11 to the slotted end of the sector 12 which engages the pinion 13 on the shaft 6. A spring 14 is employed as usual to normally yieldingly hold the shaft and pointer in the zero position of Fig. 1. These parts are designed and constructed so that with pressures of say from 0 to 10 lbs., the pointer will move from the position of Fig. 1 around the scale to the reading 10.

Above this reading in a small angular movement the pointer will indicate say from 10 to 30 lbs. This retarded action is the result of the use of a spring, which in the preferred form shown is a second Bourdon tube 15' less sensitive than the tube 9 and entirely unconnected with the tube 9 during the movement of the pointer from 0 to 10. The movable end of the tube 9 carries a toothed rack 16 and the movable end of the tube 15 carries a toothed member 17 adapted to be engaged by the rack when the pointer indicates 10 on the scale. From then on, the expansive movement of the tube 9 is retarded by the less sensitive tube 15. Preferably, the member 17 is made of material which can be bent, for instance, by pliers or any suitable tool so as to adjust the point at which the resistance of the outer tube 15 becomes effective. This toothed member 17 may be bent so as to cause its toothed end to engage in one or the other of the notches between the teeth of the rack 16 so as to vary the point of connection between the tubes in a radial direction.

By this construction it is possible to make the tubes of standard type and mount the tubes and the frame of the mechanism upon a base member 18 independently of the casing.

I claim:

1. In a pressure gauge the combination of two Bourdon tubes, an indicator connected to and movable with only one tube at certain pressures and means for connecting said tubes so that they work together at higher pressures.

2. In a pressure gauge, two Bourdon tubes, an indicator connected to and movable with only one of said tubes at certain pressures, and a notched extension for connecting said tubes whereby they work together at higher pressures.

3. In a pressure gauge, two Bourdon tubes, an indicator connected to and movable with one tube only at certain pressures, a notched extension carried by said tube and an adjustable arm carried by the other tube for engagement with said notched extension whereby said tubes will work together at higher pressures.

4. In a pressure gauge, two Bourdon tubes, a rack movable with one tube and a bendable tooth movable with the other member for coaction with said rack, said tooth being adapted to co-act with said rack at a plurality of points whereby the radial point of co-action between the parts may be varied.

ROBERT INGHAM.